US007048992B2

(12) United States Patent
Zhang et al.

(10) Patent No.: US 7,048,992 B2
(45) Date of Patent: May 23, 2006

(54) FABRICATION OF PARASCAN TUNABLE DIELECTRIC CHIPS

(75) Inventors: Chen Zhang, Clarksville, MD (US); John King, Ellicott City, MD (US); Luna Chiu, Ellicott City, MD (US)

(73) Assignee: Paratek Microwave, Inc., Columbia, MD (US)

( * ) Notice: Subject to any disclaimer, the term of this patent is extended or adjusted under 35 U.S.C. 154(b) by 0 days.

(21) Appl. No.: 10/760,875

(22) Filed: Jan. 20, 2004

(65) Prior Publication Data

US 2004/0227228 A1 Nov. 18, 2004

Related U.S. Application Data

(60) Provisional application No. 60/445,337, filed on Feb. 5, 2003.

(51) Int. Cl.
*B32B 3/00* (2006.01)
*H01P 5/00* (2006.01)
*H01P 1/18* (2006.01)

(52) U.S. Cl. .......................... 428/209; 333/1; 333/161; 257/662

(58) Field of Classification Search ................ 428/210, 428/689–699, 700–701, 209; 333/1, 161; 257/662
See application file for complete search history.

(56) References Cited

U.S. PATENT DOCUMENTS 3,757,175 A 9/1973 Kim et al. .................. 317/234
5,312,790 A 5/1994 Sengupta et al. ........... 501/137
5,427,988 A 6/1995 Sengupta et al. ........... 501/137
5,486,491 A 1/1996 Sengupta et al. ........... 501/137
5,593,495 A 1/1997 Masuda et al. ................ 117/4
5,635,433 A 6/1997 Sengupta .................... 501/137
5,635,434 A 6/1997 Sengupta .................... 501/138

(Continued)

OTHER PUBLICATIONS

PCT International Search Report for International Application No. PCT/US04/03421 dated Dec. 9. 2004.

*Primary Examiner*—Cathy F. Lam
(74) *Attorney, Agent, or Firm*—James S. Finn

(57) ABSTRACT

A tunable dielectric chip, and method of manufacture therefore, that comprises a dielectric substrate, the dielectric substrate patterned to a critical dimension, a metallized portion integral to the dielectric substrate, and an encapsulant covering an any portion of the dielectric substrate not covered by the metallized portion. A thin titanium layer can be deposited in between the metallized portion and the dielectric substrate to promote adhesion. The dielectric substrate can be a dielectric thick film. The thickness of the titanium can vary from 200A to 500A and the metallized portion integral to the dielectric substrate in a preferred embodiment is gold and varies in thickness from 3 um to several microns depending on the application. Further, in the present preferred embodiment, the encapsulant is a photo-definable encapsulant. The present invention also provides solder pads integral to the metallized portion enabling maximan protection from moisture and other contaminants.

The metallized portion discussed above in a preferred embodiment is formed by cleaning the surface of the thick film tunable dielectric, applying a photoresist coating of a thin film metal to the thick film tunable dielectric, soft baking the thick film tunable dielectric with the thin film metal coated thereon, exposing the thick film tunable dielectric with the thin film metal coated thereon, post exposure baking the thick film tunable dielectric with the thin film metal coated thereon; and developing the thick film tunable dielectric with the thin film metal coated thereon.

6 Claims, 6 Drawing Sheets

U.S. PATENT DOCUMENTS

| | | | | |
|---|---|---|---|---|
| 5,640,042 | A | 6/1997 | Koscica et al. | 257/595 |
| 5,693,429 | A | 12/1997 | Sengupta et al. | 428/699 |
| 5,694,134 | A | 12/1997 | Barnes | 343/700 |
| 5,766,697 | A | 6/1998 | Sengupta et al. | 427/585 |
| 5,830,591 | A | 11/1998 | Sengupta et al. | 428/701 |
| 5,846,893 | A | 12/1998 | Sengupta et al. | 501/137 |
| 5,886,867 | A | 3/1999 | Chivukula et al. | 361/311 |
| 5,990,766 | A | 11/1999 | Zhang et al. | 333/205 |
| 6,074,971 | A | 6/2000 | Chiu et al. | 501/139 |
| 6,377,142 | B1 | 4/2002 | Chiu et al. | 333/238 |
| 6,377,217 | B1 | 4/2002 | Zhu et al. | 343/700 |
| 6,377,440 | B1 | 4/2002 | Zhu et al. | 361/311 |
| 6,404,614 | B1 | 6/2002 | Zhu et al. | 361/277 |
| 6,444,336 | B1 * | 9/2002 | Jia et al. | 428/701 |
| 6,448,650 | B1 | 9/2002 | Saran et al. | 257/758 |
| 6,492,883 | B1 | 12/2002 | Liang et al. | 333/132 |
| 6,514,895 | B1 | 2/2003 | Chiu et al. | 501/137 |
| 6,525,630 | B1 | 2/2003 | Zhu et al. | 333/205 |
| 6,531,936 | B1 | 3/2003 | Chiu et al. | 333/164 |
| 6,535,076 | B1 | 3/2003 | Partridge et al. | 333/17.1 |
| 6,538,603 | B1 | 3/2003 | Chen et al. | 342/372 |
| 6,556,102 | B1 | 4/2003 | Sengupta et al. | 333/161 |
| 6,590,468 | B1 | 7/2003 | du Toit et al. | 333/17.3 |
| 6,597,265 | B1 | 7/2003 | Liang et al. | 333/204 |
| 6,689,681 | B1 | 2/2004 | Watanabe | 438/633 |
| 6,717,266 | B1 | 4/2004 | Marathe et al. | 257/751 |

* cited by examiner

FABRICATION OF PARASCAN TUNABLE DIELECTRIC CHIPS

CROSS-REFERENCE TO RELATED APPLICATION

This application claims priority to U.S. Provisional Patent Application Ser. No. 60/445,337, "FABRICATION OF PARASCAN TUNABLE DIELECTRIC CHIPS" filed Feb. 5, 2003, by Chen Zang et al.

BACKGROUND OF THE INVENTION

The present invention generally relates to dielectric chips and more specifically to the fabrication of tunable dielectric chips. Still more particularly the present invention relates to the fabrication of tunable dielectric chips that are made from Paracan tunable dielectrics.

RF microwave devices made of tunable dielectrics (such as Parascan, the trademarked tunable dielectric material invented by Paratek Microwave Corporation, the assignee of the present invention) is typically screen printed on different gsubstrates to form a thick film layer. These dielectric films have average surface roughness between 0.4 um to 1 um and peak to valley roughness more than 4 um. A thin film layer more than 3 um is required to pattern on these rough thick films in order to make tunable RF devices. Typically, in the semiconductor industry, thin film is patterned on a smooth surface such as a polished silicon wafer and the thickness of the film is less than 1 um. Patterning a 3 um or thicker thin film on rough dielectrics is a challenge.

Therefore, a strong need in the industry exists to provide the ability to pattern a 3 um or thicker thin film on rough dielectrics to enable the fabrication of tunable dielectric chips that are made from Paracan tunable dielectrics.

SUMMARY OF THE INVENTION

The present invention provides a tunable dielectric chip that comprises a dielectric substrate, the dielectric substrate patterned to a critical dimension, a metallized portion integral to the dielectric substrate, and an encapsulant covering any portion of the dielectric substrate not covered by the metallized portion. A thin titanium layer can be deposited in between the metallized portion and the dielectric substrate to promote adhesion. The dielectric substrate can be a dielectric thick film. The thickness of the titanium can vary from 200 A to 500 A and the metallized portion integral to the dielectric substrate in a preferred embodiment is gold and varies in thickness from 3 um to several microns depending on the application. Further, in the present preferred embodiment, the encapsulant is a photo-definable encapsulant. The present invention also provides solder pads integral to the metallized portion enabling maximan protection from moisture and other contaminants.

The metallized portion discussed above in a preferred embodiment is formed by cleaning the surface of the thick film tunable dielectric, applying a photoresist coating of a thin film metal to the thick film tunable dielectric, soft baking the thick film tunable dielectric with the thin film metal coated thereon, exposing the thick film tunable dielectric with the thin film metal coated thereon, post exposure baking the thick film tunable dielectric with the thin film metal coated thereon, and developing the thick film tunable dielectric with the thin film metal coated thereon.

The encapsulant covering any portion of the dielectric substrate not covered by the metallized portion is formed by surface cleaning the thick film tunable dielectric with the thin film metal coated thereon, baking the thick film tunable dielectric with the thin film metal coated thereon, adhesion promoter coating the thick film tunable dielectric with the thin film metal coated thereon, encapsulent coating the thick film tunable dielectric with the thin film metal coated thereon, creating a thick film tunable dielectric with the thin film metal and encapsulent coated thereon, soft baking the thick film tunable dielectric with the thin film metal and encapsulent coated thereon, exposing the thick film tunable dielectric with the thin film metal and encapsulent coated thereon, pre-develop baking the thick film tunable dielectric with the thin film metal and encapsulent coated thereon, and curing the thick film tunable dielectric with the thin film metal and encapsulent coated thereon.

The solder pads integral to the metallized portion mentioned above in a preferred embodiment are formed by surface cleaning the thick film tunable dielectric with the thin film metal and encapsulent coated thereon, photoresist coating the thick film tunable dielectric with the thin film metal and encapsulent coated thereon, soft baking the thick film tunable dielectric with the thin film metal and encapsulent coated thereon, exposing the thick film tunable dielectric with the thin film metal and encapsulent coated thereon, post exposure baking the thick film tunable dielectric with the thin film metal and encapsulent coated thereon, developing the thick film tunable dielectric with the thin film metal and encapsulent coated thereon, inspecting the thick film tunable dielectric with the thin film metal and encapsulent coated thereon, descumming the thick film tunable dielectric with the thin film metal and encapsulent coated thereon, metalizing at least one solder pad on the thick film tunable dielectric with the thin film metal and encapsulent coated thereon thereby creating a thick film tunable dielectric with the thin film metal, encapsulent coating and at least one metal solder pad thereon, acetone immersing the thick film tunable dielectric with the thin film metal, encapsulent coating and at least one metal solder pad thereon, remover liftoff of the thick film tunable dielectric with the thin film metal, encapsulent coating and at least one metal solder pad thereon, inspecting the thick film tunable dielectric with the thin film metal, encapsulent coating and metal at least one solder pad thereon, and final cleaning of the thick film tunable dielectric with the thin film metal, encapsulent coating and at least one metal solder pad thereon.

The present invention also provides for a method of fabricating tunable dielectric chips, comprising the steps of defining a critical dimension on the dielectric via patterning and metallization, and encapsulating a critical area on the critical dimension in order to protect the critical area from moisture and other contaminations. To elaborate on the first step of defining a critical dimension on the dielectric via patterning and metallization, this step can include the following sub-steps of cleaning the surface of a thick film tunable dielectric, applying a photoresist coating of a thin film metal to the thick film tunable dielectric, soft baking the thick film tunable dielectric with the thin film metal coated thereon, exposing the thick film tunable dielectric with the thin film metal coated thereon, post exposure baking the thick film tunable dielectric with the thin film metal coated thereon, developing the thick film tunable dielectric with the thin film metal coated thereon, inspecting the thick film tunable dielectric with the thin film metal coated thereon, and descumming the thick film tunable dielectric with the thin film metal coated thereon.

To elaborate on the second step of encapsulating a critical area on the critical dimension in order to protect the critical area from moisture and other contaminations, this step can include the following sub-steps of surface cleaning the thick film tunable dielectric with the thin film metal coated thereon, baking the thick film tunable dielectric with the thin film metal coated thereon, adhesion promoter coating the thick film tunable dielectric with the thin film metal coated thereon, encapsulent coating the thick film tunable dielectric with the thin film metal coated thereon, creating a thick film tunable dielectric with the thin film metal and encapsulent coated thereon, soft baking the thick film tunable dielectric with the thin film metal and encapsulent coated thereon, exposing the thick film tunable dielectric with the thin film metal and encapsulent coated thereon, pre-develop baking the thick film tunable dielectric with the thin film metal and encapsulent coated thereon, curing the thick film tunable dielectric with the thin film metal and encapsulent coated thereon, and descumming the thick film tunable dielectric with the thin film metal and encapsulent coated thereon.

The present method can further include the step of metallizing at least one solder pad on the tunable dielectric chip. This metallizing at least one solder pad step can include the following sub-steps of surface cleaning the thick film tunable dielectric with the thin film metal and encapsulent coated thereon, photoresist coating the thick film tunable dielectric with the thin film metal and encapsulent coated thereon, soft baking the thick film tunable dielectric with the thin film metal and encapsulent coated thereon, exposing the thick film tunable dielectric with the thin film metal and encapsulent coated thereon, post exposure baking the thick film tunable dielectric with the thin film metal and encapsulent coated thereon, developing the thick film tunable dielectric with the thin film metal and encapsulent coated thereon, inspecting the thick film tunable dielectric with the thin film metal and encapsulent coated thereon, descumming the thick film tunable dielectric with the thin film metal and encapsulent coated thereon, metallizing at least one solder pad on the thick film tunable dielectric with the thin film metal and encapsulent coated thereon thereby creating a thick film tunable dielectric with the thin film metal, encapsulent coating and at least one metal solder pad thereon, acetone immersing the thick film tunable dielectric with the thin film metal, encapsulent coating and at least one metal solder pad thereon, remover liftoff of the thick film tunable dielectric with the thin film metal, encapsulent coating and at least one metal solder pad thereon, inspecting the thick film tunable dielectric with the thin film metal, encapsulent coating and metal at least one solder pad thereon, and final cleaning of the thick film tunable dielectric with the thin film metal, encapsulent coating and at least one metal solder pad thereon.

DESCRIPTION OF THE PREFERRED EMBODIMENT

The applicant of the present invention has successfully developed and describes herein a technique that patterns thin film metals on thick film dielectrics which make Parascan® RF tunable devices a success.

To provide Fabrication of Parascan® tunable dielectric chips of the present invention requires three major steps. The first step is to define critical dimension (CD) on the dielectric via patterning and metallization. The second step is encapsulation in order to protect the critical area from moisture and other contaminations. The third step is creation of a solder pad. This step is optional depending on the design.

Typically, gold metallization is used for step one, due to its high conductivity as well as good corrosion resistance. However, it is understood that other metals can also be used instead of gold provided they have similar properties as gold. A thin metallic layer such as a titanium layer 430 is deposited in between the gold and a dielectric thick film to promote adhesion. Thickness of the gold varies from 3 um to several microns depending on the application of the devices. Titanium 430 thickness can vary from 200 A to 500 A. A preferred embodiment of the present invention has a typical thickness of 350 A. Metal CD size for the devices starts from 4 um and varies with designs. Encapsulation is conducted after step one, starting from substrate cleaning and baking. A temperature as high as 450° C. is required for the baking for two purposes: bake out moisture and remove any residual photoresist that is trapped in the dielectric films. A photo-definable encapsulant is used in this case. The areas that require protection are patterned with encapsulation materials followed by curing.

After the encapsulation, the whole crystal fabrication process can be considered finished unless special solder pads are required. The process for creating solder pads is similar to step one, except the metallization metal used for this step must be compatible with the soldering material. Typically, copper is selected as the material for solder pad with a flash of gold on top for protection. Again, however, this is one preferred embodiment of the present invention and it is anticipated that other metals can be used for this step in alternate embodiments.

Figure 1:
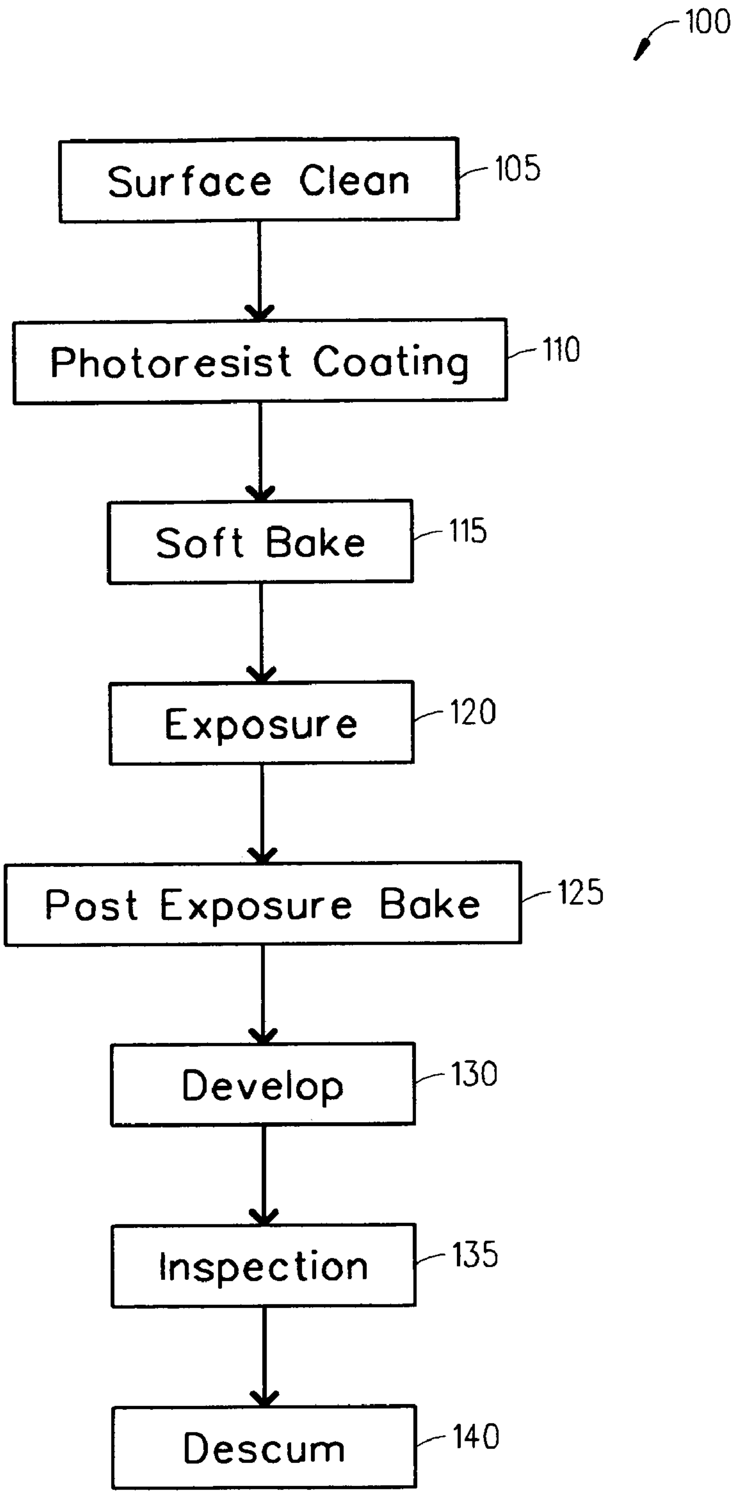
FIG. 1 shows the process flow for gap defining (step 1)
Figure 2:
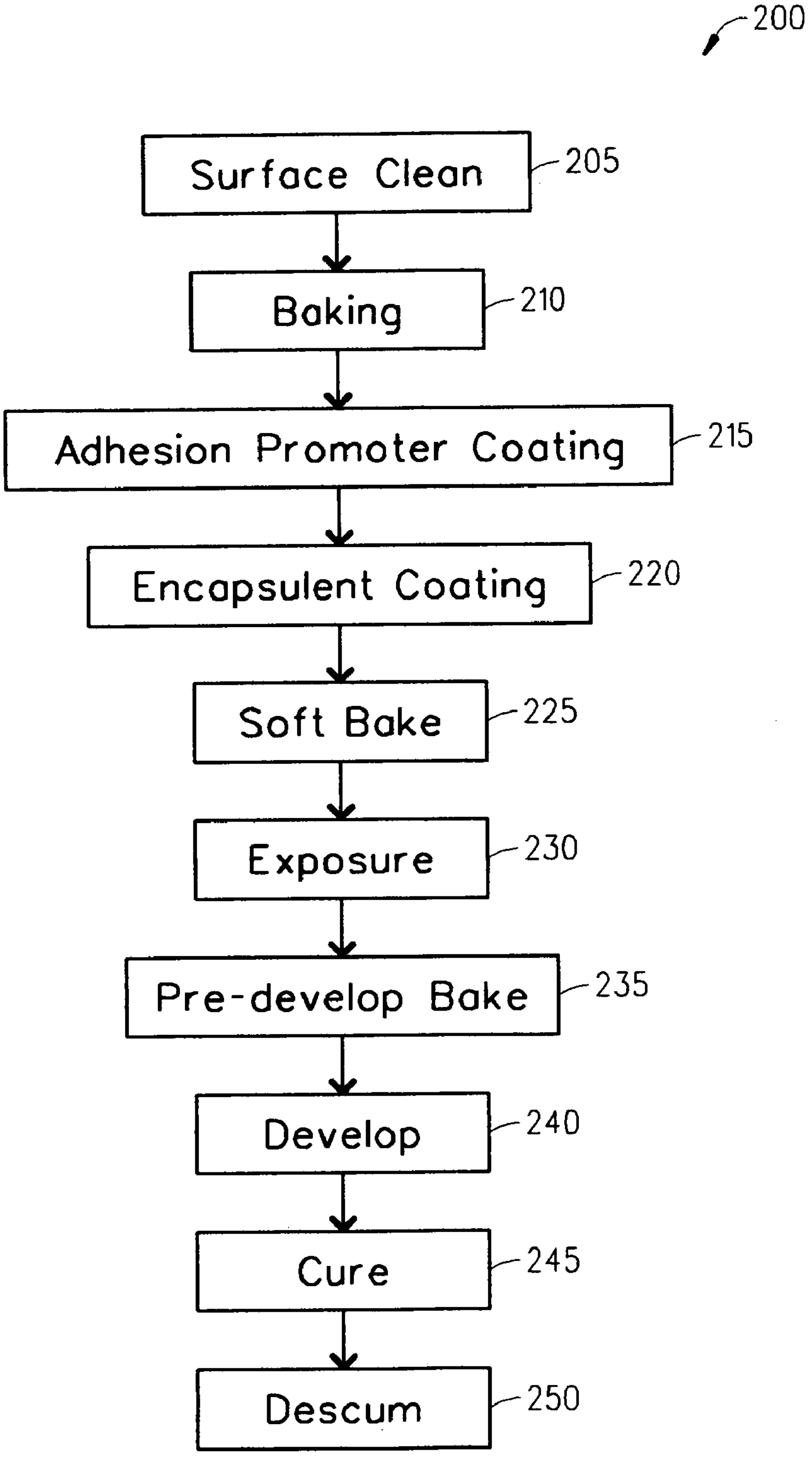
FIG. 2 shows process flow for encapsulation (step2)
Figure 3:
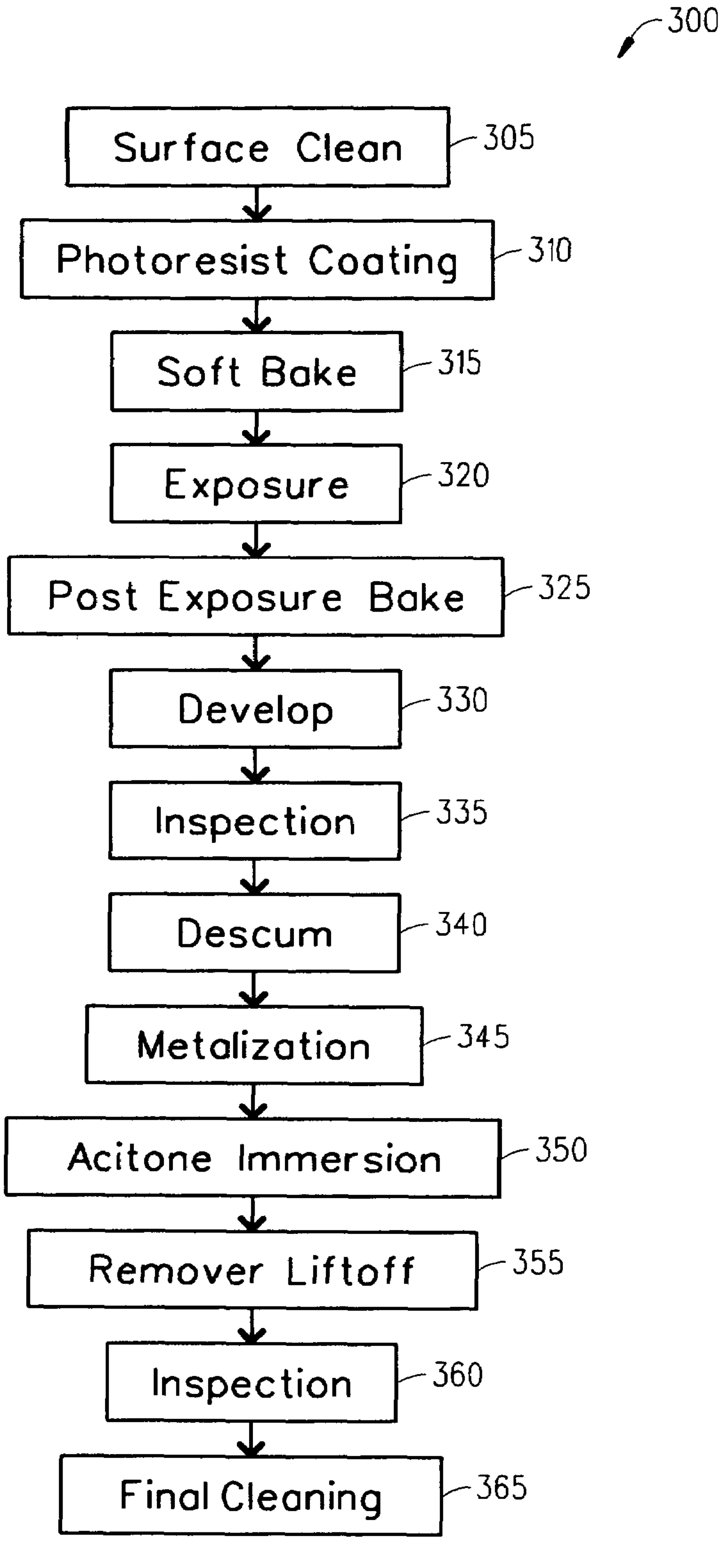
FIG. 3 shows the process flow for the optional solder pad creation (step3)

Turning now to the figures, FIGS. 1–3 are flow charts for each step described above. FIG. 1, shown generally at 100, depicts the process flow for gap defining (step 1). The first step in the process is to prepare the surface by surface cleaning 105. Next, at 110, a photoresist is applied and soft baked at 115. The next step is exposure at 120 and then a post-exposure bake at 125. Developing takes place at 130 with an inspection following at 135. The final step is then to descum at step 140.

FIG. 2 shows process flow for encapsulation (step 2). This is shown generally as 200, with the first step being surface cleaning, 205. Next is baking at 210, followed by adhesion promoter coating 215 and encapsulent coating 220. Soft baking takes place at 225 followed by exposure at 230. The step of pre-develop baking takes place at 235 and subsequenty at 240 the process includes developing and curing at 245. The final step is then to descum at step 250.

Turning now to FIG. 3, which includes the flow for the optional solder pad creation (step3). The flow is shown generally as 300, with the first step in the flow again starting with a surface cleaning at 305. Next is a photo resist coating at 310 and soft baking at 315. Exposure occurs at 320, followed by a post exposure bake at 325. Developing occurs at 330, with an inspection following at 335. Descum occurs at 340 with the metallization step following at 345. An acetone immersion happens at 350 with a remover liftoff occurring shortly thereafter at 355. An inspection once again occurs at 360 with a final cleaning taking place next at 365.

Figure 4:
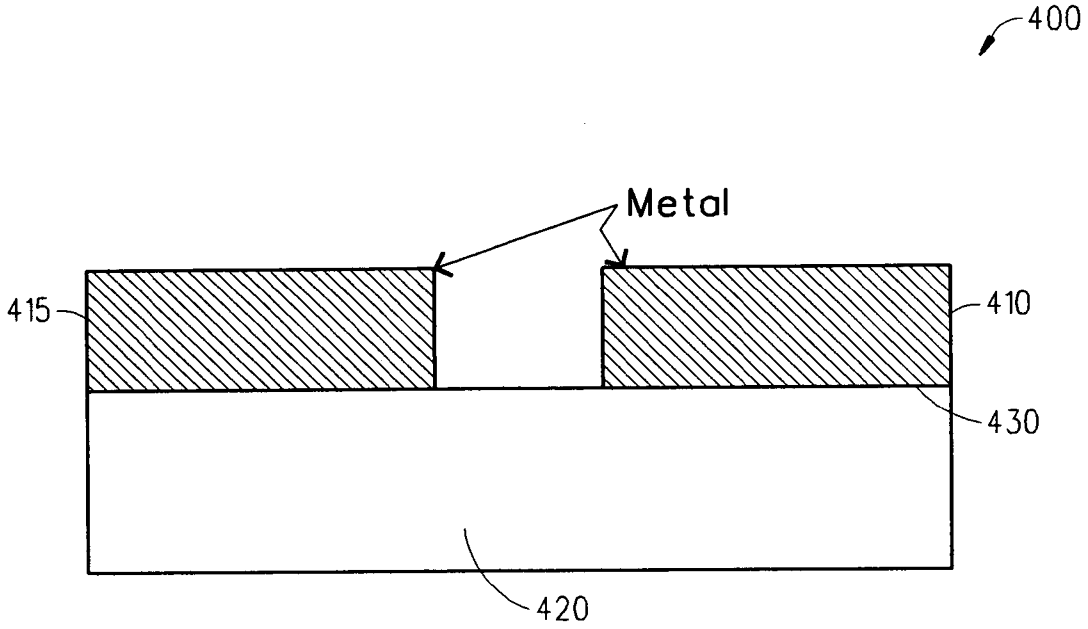
FIG. 4 illustrates the schematic of finished step one.
Figure 5:
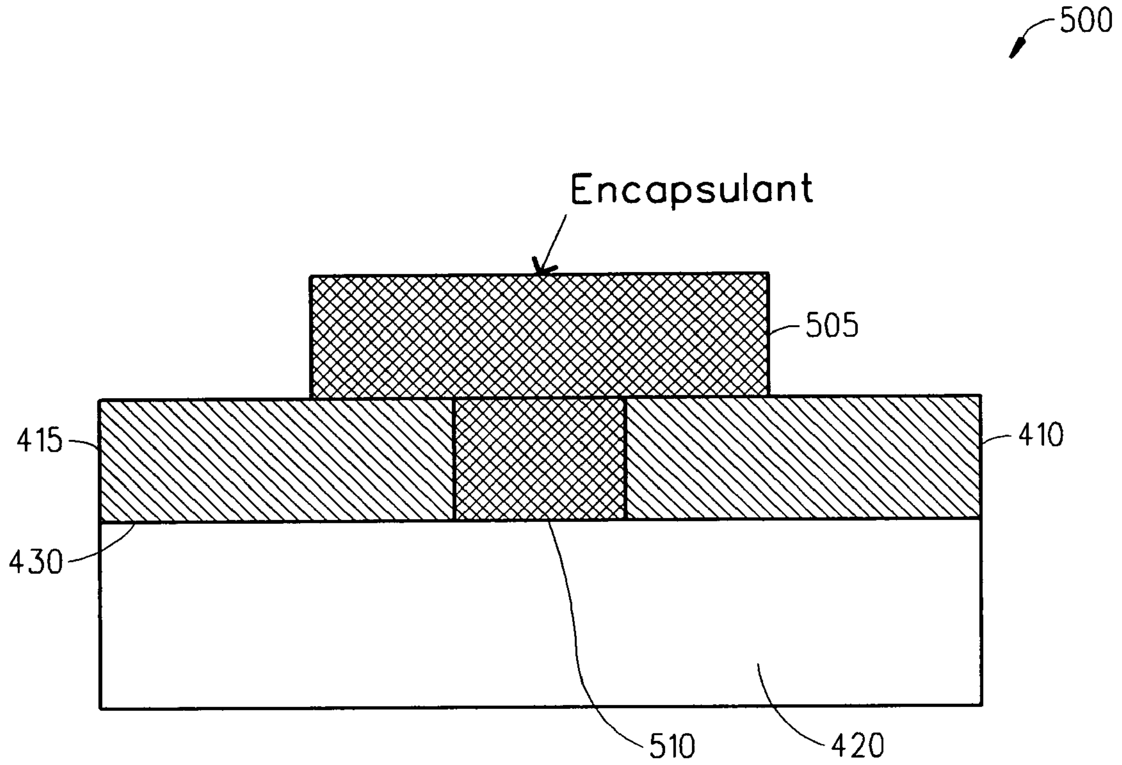
FIG. 5 depicts the schematic of finished step two.

FIG. 4 illustrates a depiction of finished step one, shown generally as 400, which includes defining the critical dimension (CD) on the dielectric 420 via patterning and metallization of metals 410 and 415. The second step, shown as 500 of FIG. 5, is encapsulation 505 above metals 410 and 415 and above dielectric 420 in order to protect the critical area 510 from moisture and other contaminations. Critical area 510 contains the same encapsulant as at 505.

Figure 6:
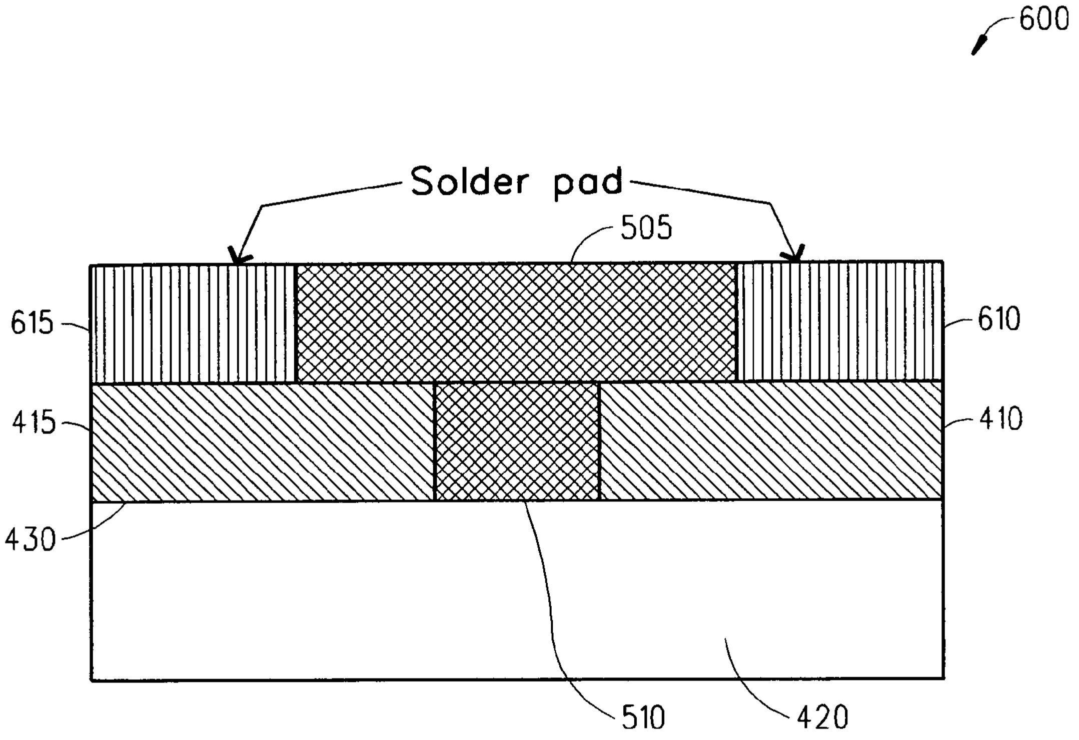
FIG. 6 shows the schematic of finished step three.

In FIG. 6, at 600 is the third step of creation of the optional solder pads 610 and 615. Solder pads 610 and 615 can be placed adjacent to the ecapsulation portion 505 and above metals 410 and 415 which are above dielectric 420. This provides for maximan protection from moisture and other contaminants. Again, this step is optional depending on the design.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A tunable dielectric chip, comprising:

a dielectric substrate;

a metallized portion formed over said dielectric substrate;

a thin layer containing titanium is placed between said metallized portion and said dielectric substrate to promote adhesion to said dielectric substrate, wherein the thickness of said thin titanium layer varies from 200A to 500A; and an encapsulant covering any portion of said dielectric substrate not covered by said metallized portion.

2. The tunable dielectric chip of claim 1, wherein said dielectric substrate is a dielectric thick film.

3. The tunable dielectric chip of claim 1, wherein said encapsulant's dimensions are capable of being defined by a photo definable process.

4. The tunable dielectric chip of claim 1, further comprising solder pads integrally formed over said metallized portion enabling maximun protection from moisture and other contaminants.

5. The tunable dielectric chip of claim 1, wherein said metallized portion varies in thickness from 3 to 7 microns.

6. The tunable dielectric chip of claim 5, wherein said metallized portion is gold.

* * * * *